US010064057B2

(12) United States Patent
Aldana et al.

(10) Patent No.: US 10,064,057 B2
(45) Date of Patent: Aug. 28, 2018

(54) SECURE FINE TIMING MEASUREMENT EXCHANGE

(71) Applicant: QUALCOMM Incorporated, San Diego, CA (US)

(72) Inventors: Carlos Horacio Aldana, Mountain View, CA (US); Alireza Raissinia, Monte Sereno, CA (US); Santosh Vamaraju, San Jose, CA (US); Kumar Anand, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/333,551

(22) Filed: Oct. 25, 2016

(65) Prior Publication Data

US 2017/0257758 A1  Sep. 7, 2017

Related U.S. Application Data

(60) Provisional application No. 62/301,788, filed on Mar. 1, 2016.

(51) Int. Cl.
| | |
|---|---|
| *H04M 3/16* | (2006.01) |
| *H04W 12/06* | (2009.01) |
| *H04W 64/00* | (2009.01) |
| *H04W 24/10* | (2009.01) |
| *H04W 12/04* | (2009.01) |

(Continued)

(52) U.S. Cl.
CPC .......... *H04W 12/06* (2013.01); *G01S 5/0289* (2013.01); *H04W 4/023* (2013.01); *H04W 12/04* (2013.01); *H04W 12/08* (2013.01); *H04W 24/10* (2013.01); *H04W 64/00* (2013.01); *H04W 84/12* (2013.01)

(58) Field of Classification Search
CPC ..... H04W 64/00; H04W 4/043; H04W 4/023; H04W 84/12; H04W 24/00; H04W 76/02; H04W 24/08; H04W 24/10
See application file for complete search history.

(56) References Cited

U.S. PATENT DOCUMENTS

| | | | | |
|---|---|---|---|---|
| 9,742,737 | B2 * | 8/2017 | Steiner | ................ H04L 63/0428 |
| 2014/0355461 | A1 * | 12/2014 | Aldana | ..................... G01S 5/00 |
| | | | | 370/252 |

(Continued)

FOREIGN PATENT DOCUMENTS

WO  2015060884 A1  4/2015

OTHER PUBLICATIONS

Carlos Aldana (QUALCOMM): "802.11-2012CID_46_47_48; 11-12-1249-03-000m-802-11-2012-cid-46-47-48", IEEE SA Mentor, vol. 802.11 m, No. 3, Jan. 16, 2013, XP068040037, pp. 1-17.

(Continued)

*Primary Examiner* — Khalid Shaheed
(74) *Attorney, Agent, or Firm* — Hunter Clark PLLC

(57) ABSTRACT

Techniques for providing a secure Fine Timing Measurement (FTM) exchange between two wireless transceivers are disclosed. An example of a method according to the disclosure include transmitting a protected FTM range request message with a Dialog Token of a FTM frame, receiving a protected FTM range report message from a station, wherein the protected FTM range report message includes FTM information, and authenticating the station based at least in part on the FTM information included in the protected FTM range report message.

30 Claims, 13 Drawing Sheets

(51) Int. Cl.
  *H04W 12/08* (2009.01)
  *H04W 4/02* (2018.01)
  *G01S 5/02* (2010.01)
  *H04W 84/12* (2009.01)

(56) References Cited

U.S. PATENT DOCUMENTS

| | | |
|---|---|---|
| 2015/0222602 A1 | 8/2015 | Steiner et al. |
| 2015/0257120 A1 | 9/2015 | Prechner et al. |
| 2016/0212102 A1* | 7/2016 | Xu .................... H04L 69/14 |
| 2016/0366606 A1* | 12/2016 | Steiner ............... H04W 24/10 |
| 2017/0064575 A1* | 3/2017 | Eyal .................. H04L 67/18 |
| 2017/0149799 A1* | 5/2017 | Vamaraju ........... H04L 63/126 |
| 2017/0171766 A1* | 6/2017 | Amizur ............... H04W 64/00 |

OTHER PUBLICATIONS

IEEE: "IEEE P802.11-REVmcTM/D3.0", Jun. 1, 2014, Draft Standard for Information technology—Telecommunications and information Exchange Between Systems Local and Metropolitan Area Networks—Specific Requirements, Part 11: Wireless LAN Medium Access Control (MAC) and Physical Layer (PHY} Specifications, XP055308716, 58 Pages, Retrieved from the Internet: URL:http://ieeexplore.ieee.org/stamp/stamp.jsp?arnumber=7051187, [retrieved on Oct. 7, 2016].
International Search Report and Written Opinion—PCT/US2017/014044—ISA/EPO—dated Jul. 26, 2017.

* cited by examiner

| Octets | Category | Radio Measuremet Action | Dialog Token | Number of Repetitions | Measurement Request Elements |
|---|---|---|---|---|---|
| | 1 | 1 | 1 | 2 | variable |

*FIG. 6A*

| Octets | Range Entry Count | Range Entry | Error Entry Count | Error Entry | Optional Sub-elements |
|---|---|---|---|---|---|
| | 1 | M x 15 | 1 | N x 11 | Variable |

↑ 612

| Octets | Measurment Start Time | BSSID | Range | Max Range Error Exponent | Reserved |
|---|---|---|---|---|---|
| | 4 | 6 | 3 | 1 | 1 |

| Subelement ID | Name | Extensible |
|---|---|---|
| 0-220 | Reserved | |
| 221 | Vendor Specific | |
| 222-255 | Reserved | |
| TBD | Last T4 - T1 Received | |

*FIG. 6C*

| | Subelement ID | Length | T4 - T1 (in ps) | Follow-Up Dialog Token in the last FTM frame |
|---|---|---|---|---|
| Octets | 1 | 1 | 4 | 1 |

*FIG. 6D*

SECURE FINE TIMING MEASUREMENT EXCHANGE

CROSS-REFERENCE TO RELATED APPLICATIONS

This application claims the benefit of U.S. Provisional Application No. 62/301,788, filed Mar. 1, 2016, entitled "SECURE FINE TIMING MEASUREMENT EXCHANGE," the entire contents of which is hereby incorporated herein by reference.

BACKGROUND

Embodiments of the inventive subject matter generally relate to the field of wireless communication and, more particularly, to a secure positioning protocol for wireless devices.

Various positioning techniques can be employed for determining the position of a wireless communication device (e.g., a wireless local area network (WLAN) device) based on receiving wireless communication signals. For example, positioning techniques can be implemented that utilize time of arrival (TOA), the round trip time (RTT) of wireless communication signals, received signal strength indicator (RSSI), or the time difference of arrival (TDOA) of the wireless communication signals to determine the position of a wireless communication device in a wireless communication network. Some positioning techniques may be vulnerable to spoofing attacks such that one communication device may attempt to imitate another communication device.

SUMMARY

An example of a method for providing a secure Fine Timing Measurement (FTM) exchange between two wireless transceivers according to the disclosure includes transmitting a protected FTM range request message with a Dialog Token of a FTM frame, receiving a protected FTM range report message from a station, such that the protected FTM range report message includes FTM information, and authenticating the station based at least in part on the FTM information included in the protected FTM range report message.

Implementations of such a method may include one or more of the following features. At least one element of the protected FTM range request message and the protected FTM range report message may be encrypted. The encryption may be based on a key exchange between the two wireless transceivers. The encryption may be based on a membership to a trusted network. The Dialog token transmitted in the protected FTM range request message may be the Dialog token in an initial FTM frame. The FTM information may be based on a time of departure and a time of arrival of a FTM exchange between the two wireless transceivers. The FTM information may be a Follow Up Dialog token value or a collection of Follow Up Dialog token values. Authenticating the station may include calculating a distance to the station based on the FTM information, and determining if the station is within an authentication range.

An example of a method of participating in a secure Fine Timing Measurement (FTM) exchange with a mobile device according to the disclosure includes receiving a protected FTM range request message including a Dialog token of a FTM frame, transmitting a FTM request message, receiving a plurality of FTM messages, determining that a Dialog token included a frame of the plurality of FTM messages matches the Dialog token included in the FTM range request message, determining a FTM timing information based at least on one of the plurality of FTM messages, and transmitting a protected FTM range report message including the FTM timing information.

Implementations of such a method may include one or more of the following features. The FTM timing information may be based on a time of departure value (T1) and a time of arrival value (T4) in an FTM exchange. The FTM timing information may be a Round Trip Time (RTT) value based on the plurality of FTM messages. The FTM range report message may include the Follow Up Dialog Token value of the last frame of the plurality of FTM messages. The protected FTM range request message and the protected FTM range report message may include one or more encrypted elements. The FTM request message and the plurality of FTM messages may be public action frames.

An example of an apparatus for providing a secure Fine Timing Measurement (FTM) exchange between two wireless transceivers according to the disclosure includes means for transmitting a protected FTM range request message with a Dialog Token of a FTM frame, means for receiving a protected FTM range report message from a station, such that the protected FTM range report message includes FTM information, and means for authenticating the station based at least in part on the FTM information included in the protected FTM range report message.

An example of an apparatus for participating in a secure Fine Timing Measurement (FTM) exchange with a mobile device according to the disclosure includes means for receiving a protected FTM range request message including a Dialog token of a FTM frame, means for transmitting a FTM request message, means for receiving a plurality of FTM messages, means for determining that a Dialog token included a frame of the plurality of FTM messages matches the Dialog token included in the FTM range request message, means for determining a FTM timing information based at least on one of the plurality of FTM messages, and means for transmitting a protected FTM range report message including the FTM timing information.

An example of a system for providing a secure Fine Timing Measurement (FTM) exchange between two wireless transceivers according to the disclosure includes a memory, at least one processor operably coupled to the memory, a transceiver operably coupled to the memory and the at least one processor, and configured to transmit a protected FTM range request message with a Dialog Token of a FTM frame, receive a protected FTM range report message from a station, wherein the protected FTM range report message includes FTM information, such that the at least on processor is configured to authenticate the station based at least in part on the FTM information included in the protected FTM range report message.

Implementations of such a system may include one or more of the following features. At least one element of the protected FTM range request message and the protected FTM range report message may encrypted. The encryption may be based on a key exchange between the two wireless transceivers. The encryption may be based on a membership to a trusted network. The Dialog token transmitted in the protected FTM range request message may be the Dialog token in an initial FTM frame. The FTM information may be based on a time of departure and a time of arrival of a FTM exchange between the two wireless transceivers. The FTM information is a Follow Up Dialog token value or a collection of Follow Up Dialog token values. The at least one processor may be further configured to calculate a distance to the station based on the FTM information, and determine if the station is within an authentication range.

An example of a client station for participating in a secure Fine Timing Measurement (FTM) exchange with a mobile device according to the disclosure includes a memory, at least one processor operably coupled to the memory, a transceiver operably coupled to the memory and the at least one processor, and configured to receive a protected FTM range request message including a Dialog token of a FTM frame, transmit a FTM request message, receive a plurality of FTM messages, such that the at least one processor is configured to determine that a Dialog token included a frame of the plurality of FTM messages matches the Dialog token included in the FTM range request message, determine a FTM timing information based at least on one of the plurality of FTM messages, and the transceiver is configured to transmit a protected FTM range report message including the FTM timing information.

Implementations of such a client station may include one or more of the following features. The FTM timing information may be based on a time of departure value (T1) and a time of arrival value (T4) in an FTM exchange. The FTM timing information may be a Round Trip Time (RTT) value based on the plurality of FTM messages. The protected FTM range report message may include the Follow Up Dialog Token value of the last frame of the plurality of FTM messages. The protected FTM range request message and the protected FTM range report message may include one or more encrypted elements. The FTM request message and the plurality of FTM messages are public action frames.

An example of a non-transitory processor-readable storage medium comprising instructions for providing a secure Fine Timing Measurement (FTM) exchange between two wireless transceivers according to the disclosure includes code for transmitting a protected FTM range request message with a Dialog Token of a FTM frame, code for receiving a protected FTM range report message from a station, wherein the protected FTM range report message includes FTM information, and code for authenticating the station based at least in part on the FTM information included in the protected FTM range report message.

An example of a non-transitory processor-readable storage medium comprising instructions for participating in a secure Fine Timing Measurement (FTM) exchange with a mobile device according to the disclosure includes code for receiving a protected FTM range request message including a Dialog token of a FTM frame, code for transmitting a FTM request message, code for receiving a plurality of FTM messages, code for determining that a Dialog token included a frame of the plurality of FTM messages matches the Dialog token included in the FTM range request message, code for determining a FTM timing information based at least on one of the plurality of FTM messages, and code for transmitting a protected FTM range report message including the FTM timing information.

Items and/or techniques described herein may provide one or more of the following capabilities, as well as other capabilities not mentioned. Stations (STAs) in a network may utilize wireless transceivers to exchange periodic fine timing messages (FTMs) with neighboring STAs. The information within the FTMs may be used to position and/or authenticate the STAs. A secure handshake between STAs may allow for the exchange of security keys and enable the transfer of protected data. A first station (STA1) may send a Protected FTM Range Request message to a second station (STA2). The Protected FTM Range Request message may include one or more encrypted elements. The Dialog Token of a FTM frame to be sent by STA1 may be included in the FTM Range Request. STA2 may transmit a public FTM Request message, intended for STA1. A spoofing station may attempt to imitate STA1 and reply to the FTM Request message and initiate a FTM exchange with STA2. After completing a FTM exchange with the spoofing station, STA2 may transmit a Protected FTM Range report. The Protected FTM Range report may include timing information associated with the FTM exchange between STA2 and the spoofing station. STA1 may evaluate the Protected FTM Range report to determine the authenticity of the timing information and/or detect the presence of a secure token. STA1 may initiate a FTM exchange with STA2. STA2 may send a second Protected FTM Range report including timing information and/or Follow Up Dialog Token information associated with the FTM exchange between STA1 and STA2. STA1 may evaluate the second Protected FTM Range report to determine the authenticity of the timing information. A network may enable or disable subsequent secure exchanges, or other interactions, between STA 1 and STA2 based on the authenticity of the timing information. Other capabilities may be provided and not every implementation according to the disclosure must provide any, let alone all, of the capabilities discussed. A distance between the stations may be determined based on one or more FTM exchanges. Position based authentication may be enabled based on the determined distance. Further, it may be possible for an effect noted above to be achieved by means other than that noted, and a noted item/technique may not necessarily yield the noted effect.

BRIEF DESCRIPTION OF THE DRAWINGS

FIG. 6A is an example of the content in a Radio Measurement Request frame Action field format message.

FIG. 6B is an example of the content in a Fine Timing Measurement Range Report message.

FIG. 6C is an example of the content in an options sub-element for the Fine Timing Measurement Range Report message described in FIG. 6B.

FIG. 6D is an example of the content in a Last T4-T1 Received message as an optional sub-element in the Fine Timing Measurement Range Report message described in FIG. 6D.

DETAILED DESCRIPTION

Figure 1A:
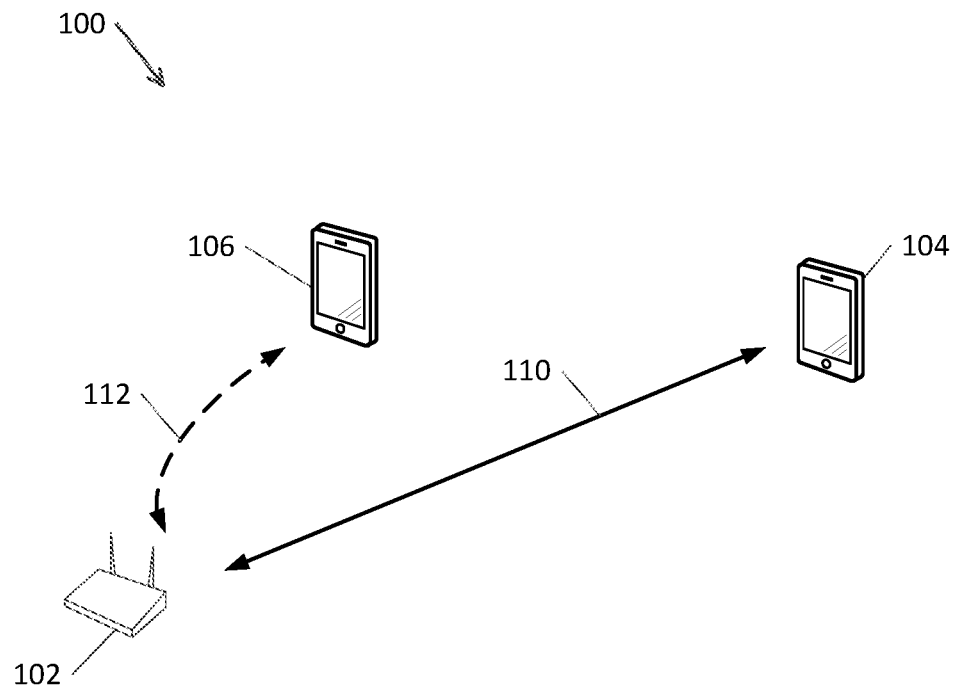
FIG. 1A is an example block diagram of an FTM exchange between two stations with an intervening spoofing station.

The description that follows includes exemplary systems, methods, techniques, instruction sequences, and computer program products that embody techniques of the present inventive subject matter. However, it is understood that the described embodiments may be practiced without these specific details. For instance, although examples refer to a secure fine timing measurement exchange for wireless local area network (WLAN) devices, embodiments are not so limited. In other embodiments, the secure FTM positioning protocol can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, round trip time (RTT) techniques can be implemented for determining the position of the communication device. For example, the communication device can transmit a request message to one or more wireless transceivers (e.g., access points, stations, kiosks) and may receive a response message from each of the transceivers. The range between the communication device and each of the wireless transceivers can be determined by measuring the round trip time between the request messages and the corresponding response messages. The position of the communication device can be determined. In some systems, time difference of arrival (TDOA) techniques can be implemented for determining the position of the communication device. For example, the communication device can determine its position based on the difference between the ranges from each of the transceivers to the communication device. In a modern mercantile environment, the position of the mobile device may be used in conjunction with location based services. Authenticated services, special offers, discounts, store credits, or other coupons may be provided to the mobile device based on a current location. In an example, a consumer may be allowed to complete a transaction (e.g., purchase a store item) via their mobile device if the user is within a certain area. A wireless network may use the location of the mobile device to authenticate the mobile device and thus enable subsequent confidential transactions.

A position calculation unit of a wireless communication station (e.g., mobile device, access point, kiosk) may be configured to determine the position of the station based on an exchange of Fine Timing Measurement (FTM) with a neighboring station in the wireless network. The exchange may be performed in an on-demand or a periodic basis. The station may be configured to determine RTT timing information associated with the one or more neighboring stations based on the time difference between a message (M) transmitted (i.e., T1, T2), and a corresponding acknowledgment (ACK) response message transmitted by the target access point (i.e., T3, T4). The station may also transmit an RTT measurement message comprising the RTT timing information to the neighboring station (i.e., RTT=(T4-T1)−(T3-T2)). The position calculation unit can then determine the position of the communication device based, at least in part, on the RTT timing information, and position information associated with a predetermined number of network stations. In an embodiment, a secure relationship, or other type of private association, may be established between one or more stations in the wireless network. For example, the stations may exchange security keys and/or be members of a trusted network (e.g., cloud service, contact lists). Two stations in the network may utilize this secure relationship to exchange one or more FTM related messages.

A positioning scheme for use with position based authentication applications (e.g., building access, commercial transactions, data exchanges) should be resistant to spoofing attacks by an intervening third party. In a typical spoofing attack, an intervening spoofing station may attempt to imitate one of the two stations participating in an FTM exchange. Since FTM frames are generally public actions frames, the spoofing station may intercept FTM related messages and generate compatible FTM response messages in an effort imitate an intended target station.

Referring to FIG. 1A, an example block diagram of an FTM exchange between two stations with an intervening spoofing station is shown. The FTM exchange includes a wireless communication network 100 comprising a plurality of wireless transceivers such as an access point 102, a user mobile device 104, and a spoofing mobile device 106. The access point 102 may be an advanced WLAN access points capable of determining its own positions (e.g., a self-locating access point). As an example, the access point 102 may represent a commercial structure such as a check-out kiosk (e.g., cash register), an Automatic Teller Machine (ATM), etc. The mobile devices 104, 106, are examples of client stations and can be any suitable electronic device (e.g., a notebook computer, a tablet computer, a netbook, a mobile phone, a gaming console, a personal digital assistant (PDA), inventory tag, etc.) with WLAN communication capabilities. The wireless communication network 100 may include multiple access points and multiple mobile devices (not shown). A FTM exchange 110 may be initiated between the access point 102 and the user mobile device 104. In an embodiment, the user mobile device 104 transmits a message M in response to FTM Request message. The message M may comprise an identifier associated with the access point (e.g., a network address of the access point 102), an identifier associated with the user mobile device 104 (e.g., a network address of the user mobile device 104), a sequence number that identifies the FTM message, and a timestamp indicating the time instant at which the message M was transmitted. The user mobile device 104 receives a FTM acknowledgment message (ACK) from the access point 102 and may determine RTT timing information associated with the FTM exchange 110.

The spoofing mobile device 106 may intercept the FTM Request message transmitted by the access point 102, and may then attempt to engage in a faux FTM exchange 112. That is, the spoofing mobile device 106 transmits a message M in response to FTM Request message. The message M may comprise an identifier associated with the access point (e.g., a network address of the access point 102), and a fraudulent identifier associated with the user mobile device 104 (e.g., a network address of the user mobile device 104 and not the network address of the spoofing mobile device 106), a sequence number that identifies the FTM message, and a timestamp indicating the time instant at which the message M was transmitted. The spoofing mobile device 106 receives a FTM acknowledgment message (ACK) from the access point 102 and may determine RTT timing information associated with the faux FTM exchange 112. The spoofing mobile device 106 may then use the position information derived from the RTT timing information to fraudulently gain credentials on the wireless communication network 100 (i.e., the spoofing mobile device 106 has successfully imitated the user mobile device 104).

Figure 1B:
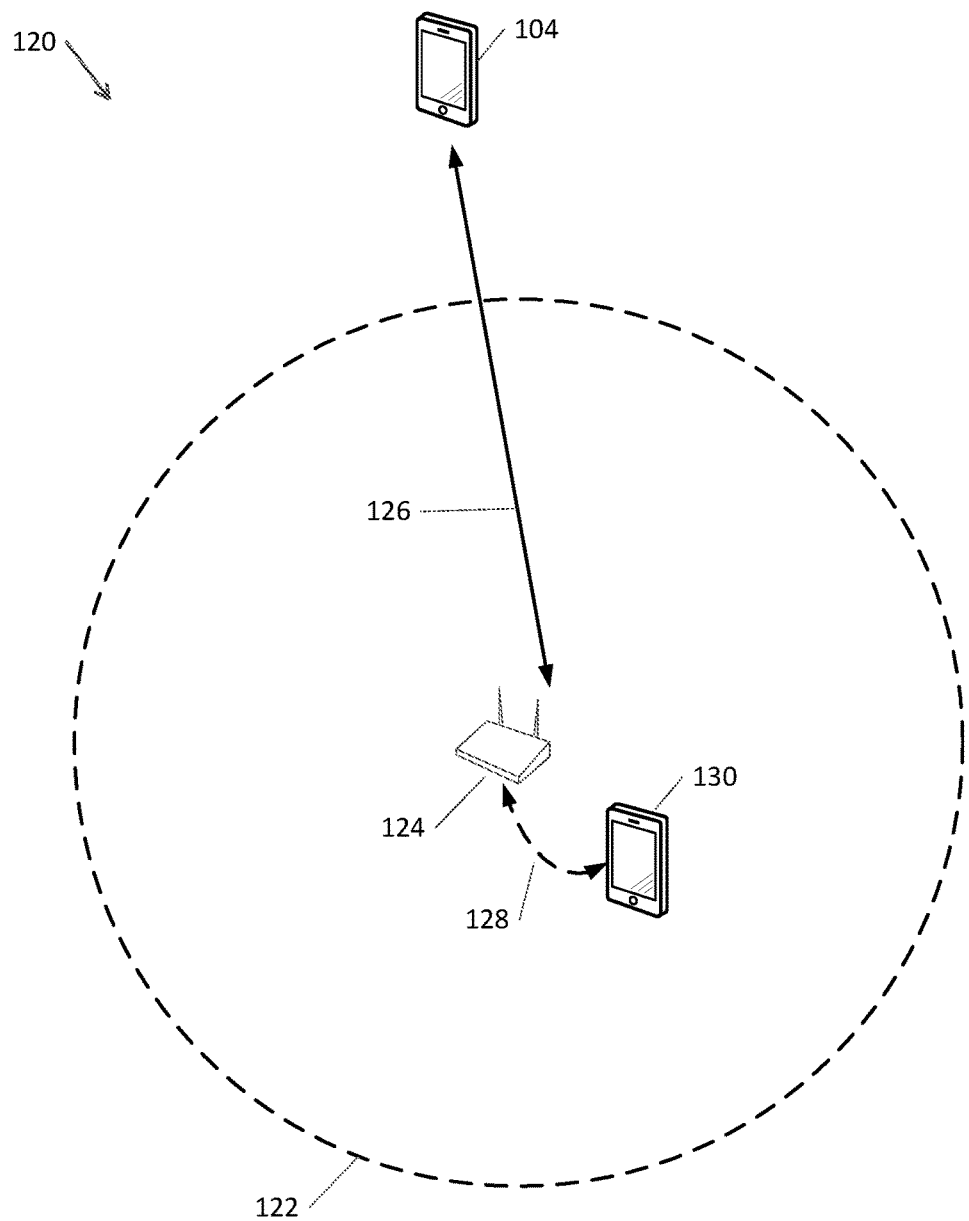
FIG. 1B is an example block diagram of a position authentication process with an intervening spoofing station.

Referring to FIG. 1B, an example network diagram of a position authentication process with an intervening spoofing station is shown. The position authentication process 120 includes a wireless kiosk 124 (e.g., an access point) and the user mobile device 104. The wireless kiosk 124 has predetermined authentication range 122. In an example, the wireless kiosk 124 may be at a check-out line in a store that is configured to allow customers to check-out (i.e., purchase goods) without waiting in line. That is, a user within the authentication range 122 may use their mobile device to complete the check-out process. In an example, the wireless kiosk 124 may transmit an FTM Request message to initiate an FTM exchange 126 in an effort to verify that the user mobile device 104 is within the authentication range 122. In this case, the user mobile device 104 is outside of the authentication range 122 and thus would not be allowed to perform a self-checkout. A spoofing client station 130 within the authentication range 122, however, may attempt to imitate the user mobile device 104 by intercepting the FTM Request message and then initiating a faux FTM exchange 128. If the spoofing client station 130 successfully fools the wireless kiosk 124, then the wireless kiosk 124 may erroneously believe that the user mobile device 104 is within the authentication range 122 and thus provide privileges to the spoofing client station 130 based on an account associated with the user mobile device 104. For example, the wireless kiosk 124 may be configured to open a locker, a vending device, or provide otherwise secure access to the spoofing client device 130. In an example, the wireless kiosk 124 may send a receipt, coupon, or other secure information to the spoofing client station 130. The secure information may be used, for example, to allow a user to exit a shopping area with the goods and a fraudulent receipt (and thus satisfy security processes).

Figure 2:
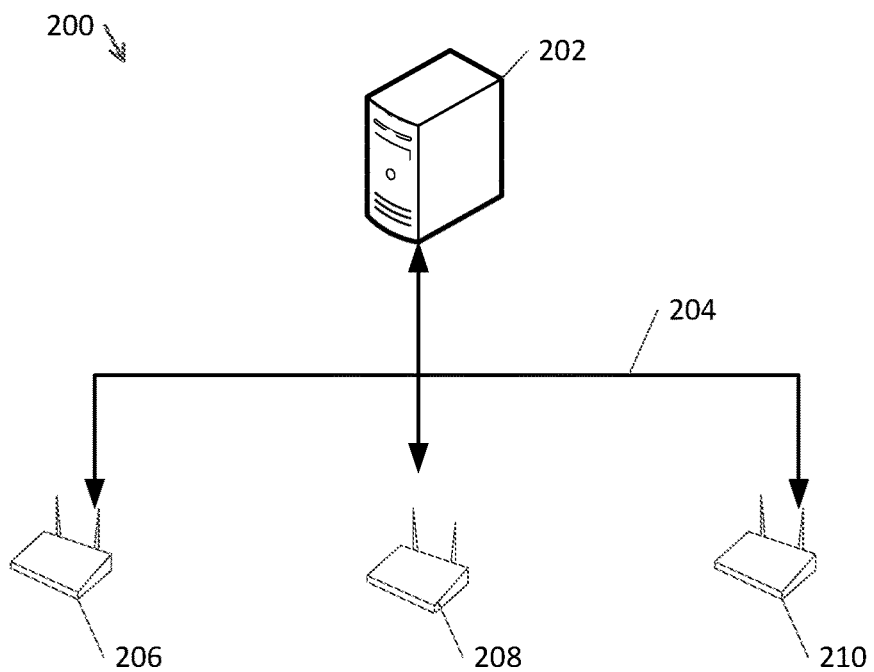
FIG. 2 is an example network diagram of a wireless local area network including a position server.

Referring to FIG. 2, an example network diagram of a wireless local area network including a position server is shown. The network 200 includes access points 206, 208, 210, a position server 202, and a communication path 204. The position server 202 is a computing device including a processor and a memory and is configured to execute computer executable instructions. For example, a position server 202 comprises a computer system including a processor, non-transitory memory, disk drives, a display, a keyboard, a mouse. The processor is preferably an intelligent device, e.g., a personal computer central processing unit (CPU), a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 202 may store (e.g., in the memory) processor-readable, processor-executable software code containing instructions for controlling the processor to perform functions described herein. The functions assist in the implementation of a secure FTM exchange. The software can be loaded onto the memory by being downloaded via a network connection, uploaded from a disk, etc. Further, the software may not be directly executable, e.g., requiring compiling before execution. The access points 206, 208, 210 are configured to communicate with the position server 202 to exchange position information via the communication path 204. The communication path 204 can be a wide area network (WAN) and can include the Internet. The position server 202 can include a data structure (e.g., relational database, flat files) to store client station (e.g., mobile device, access point) location information. For example, the position server 202 can include client station position information (e.g., lat./long., x/y), RTT information, station response information, and other information associated with an access point (e.g., SSID, MAC address, uncertainty value, coverage area, etc.). An access point 206, 208, 210 may communicate with the position server 202 and may retrieve client station location information, client response information and RTT information for use in client station positioning solutions. The configuration of the position server 202 is exemplary only, and not a limitation. In an embodiment, the position server 202 may be connected directly to an access point. More than one position servers may be used. The position server 202 can include one or more databases containing position information associated with other access points on additional networks. In an example, the position server 202 is comprised of multiple server units.

Figure 3:
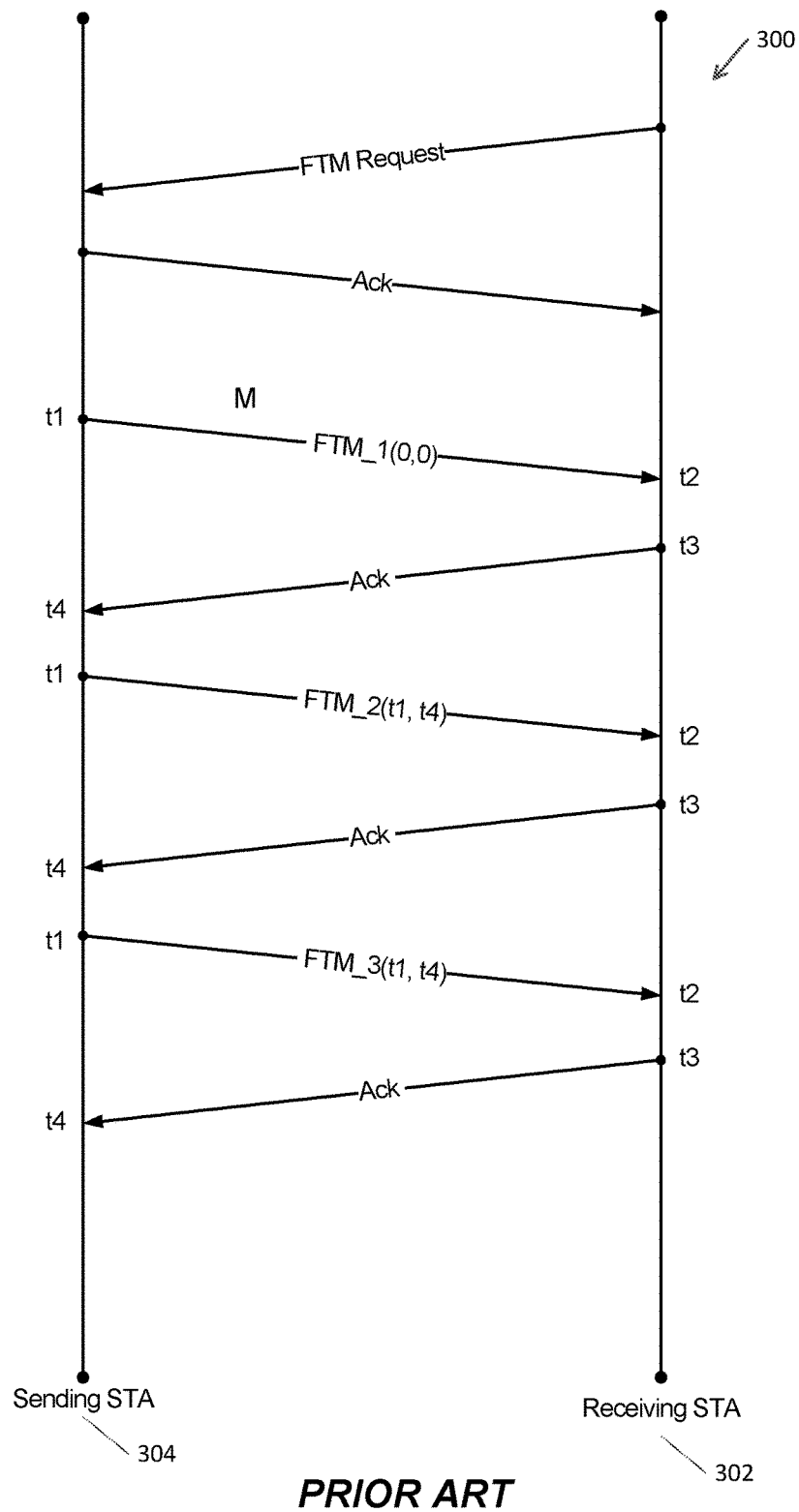
FIG. 3 is a prior art example of a conceptual diagram of a fine timing measurement exchange.

Referring to FIG. 3, a prior art example of a conceptual diagram of a FTM exchange is shown. The FTM exchange diagram 300 includes a receiving station 302 and a sending station 304. The receiving station can send a FTM request to the sending station and receive a corresponding acknowledgment message. The sending station then transmits an action frame M at time of departure t1. The action frame M is received by the receiving station at time of arrival t2, and an acknowledgment message ACK is transmitted by the receiving station at time of departure t3. The ACK message is received by the sending station at time of arrival t4. The sending station then prepares a subsequent message which includes timing information (e.g., the values for t1 and t4). The receiving station then estimates the RTT as (t4−t1)−(t3−t2). The RTT information may be used to determine a distance between the sending station 304 and the receiving station 302.

Figure 4:
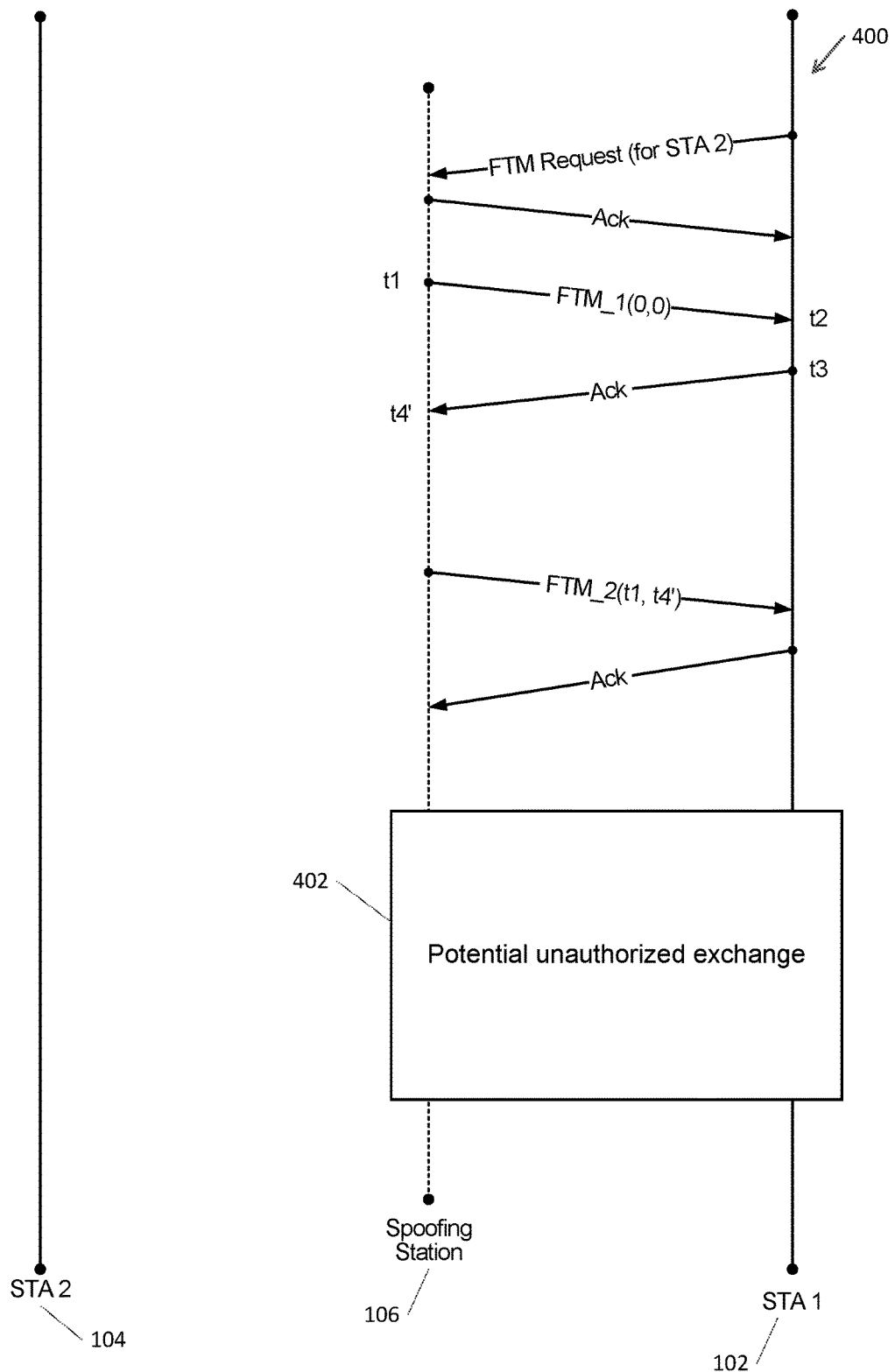
FIG. 4 is an example of a conceptual diagram of a FTM exchange being commandeered by a spoofing station.

Referring to FIG. 4, with further reference to FIG. 1A, an example of a conceptual diagram of a FTM exchange being commandeered by a spoofing station is shown. The diagram 400 includes a first station (STA 1) (e.g., the access point 102) and a second station (STA 2) (e.g., the user mobile device 104). A spoofing station (e.g., spoofing mobile device 106) is located in a position between STA 1 and STA 2. STA 1 transmits a FTM request message intended for STA 2. The spoofing station intercepts the FTM request messages and provides an acknowledgement message (Ack) back to STA 1. The spoofing station then provides an FTM exchange message at time t1 (i.e., FTM_1(0,0)) which is received by STA 1 at time t2. STA 1 transmits an Ack message at time t3 which is received by the spoofing station at time t4'. The spoofing station then sends a second FTM exchange message (e.g., FTM_2(t1,t4')) including the FTM timing information (i.e., t1, t4'). STA 1 may send an Ack message in response to receiving the second FTM exchange message. If the spoofing station successfully imitates STA 3, STA 1 may authorize an exchange 402 with the spoofing station based on the STA 2's credentials. In an example, STA 1 is an ATM and the exchange 402 includes releasing money to the spoofing station because the ATM fraudulently believes STA 2 is nearby and thus access a bank account associated with STA 2 is warranted. In another example, STA 1 is an access point in a locked building and the exchange 402 includes unlocking one or more doors, thus providing access to the spoofing station based on STA 2's established security credentials, because the access point erroneously believes STA 2 is nearby. In another example, STA 1 is a wireless kiosk 124 and the exchange 402 includes providing the spoofing station access to automated vending machines based on account information associated with STA 2.

Figure 5:
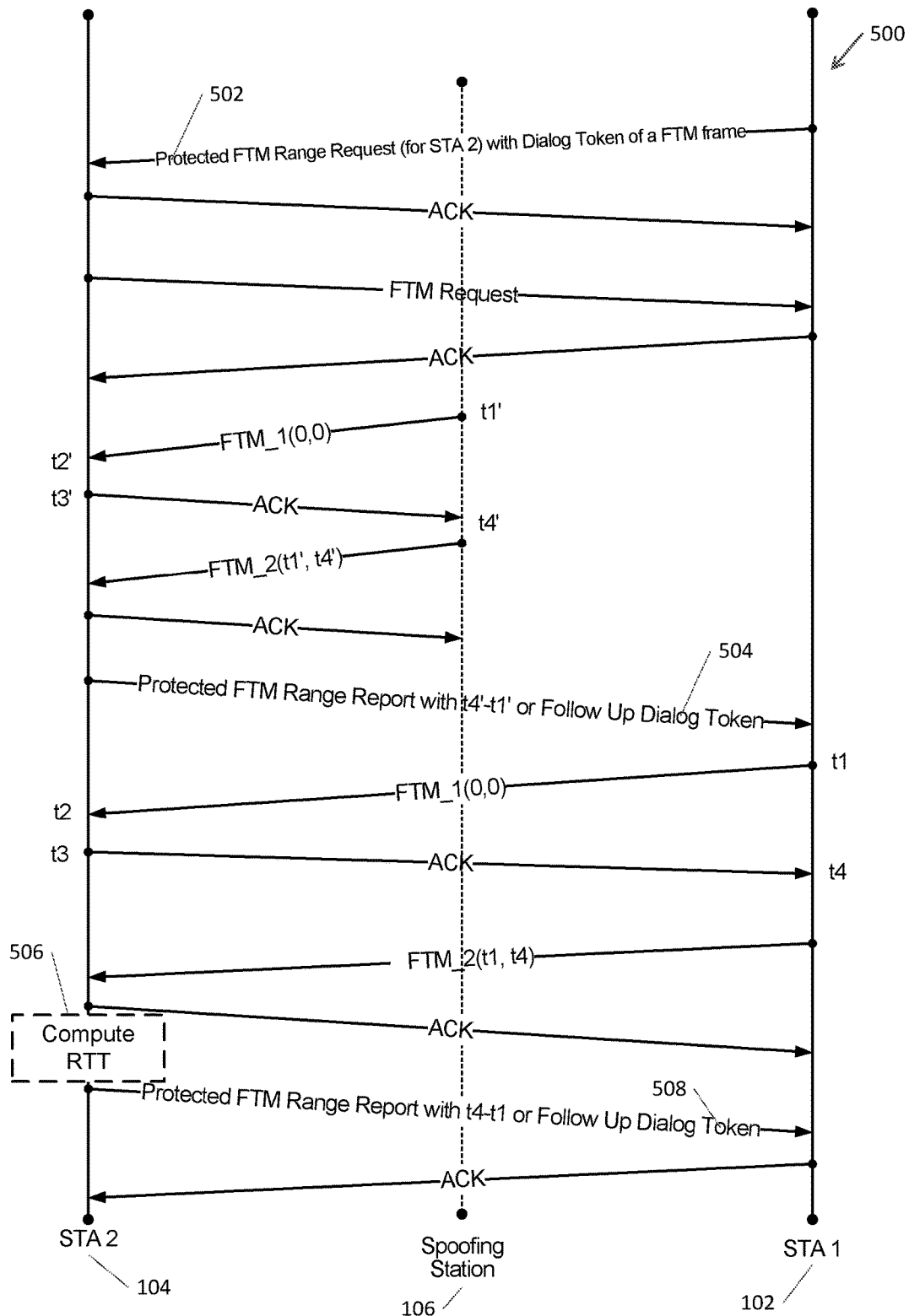
FIG. 5 is an example of a conceptual diagram of a FTM exchange with a protected FTM range report.

Referring to FIG. 5, an example of a conceptual diagram of a FTM exchange with a protected FTM range report is shown. The diagram 500 includes a first station (STA 1) (e.g., the access point 102) and a second station (STA 2) (e.g., the user mobile device 104). A spoofing station (e.g., spoofing mobile device 106) is located relatively closer to STA 1 than STA 2 is. STA 1 and STA 2 are part of a wireless network and have established a secure handshake to allow for the exchange of cryptographic keys. For example, the wireless network may include security features (e.g., key exchange) as described in IEEE 802.11I and IEEE802.11W. STA 1 and STA 2 may belong to a common cloud service (e.g., Apple iCloud®) which is configured to allocate cryptographic keys. STA 1 and STA 2 may be part of a trusted network (e.g., as defined by contact lists within the stations or on a remote server). STA 1 and STA 2 may be members of other types of authenticated groups which enable private message exchanges. STA 1 is configured to transmit a Protected FTM Range Request message 502 to STA 2, which may include the Dialog Token of a FTM frame (e.g., the initial FTM frame). In general, a Dialog Token may be an integer value (e.g., 0-255) and is used to identify measurement request/report transactions (a value of zero may be used in special cases, such as to indicate an autonomous report). In operation, a Dialog Token field may be used for matching action responses with action requests. One or more information elements (IEs) within the Protected FTM Range Request message 502 are encrypted based on the secure handshake established between STA 1 and STA 2. Since the spoofing station does not have a similar secure status with either of STA 1 or STA 2, it cannot decode the encrypted elements. Thus, the spoofing station is not aware that STA 2 has been requested to initiate a FTM exchange. STA 2 can send an Ack message upon receipt of the Protected FTM Range Request. The Ack message may be sent in the clear (e.g., without encryption). STA 2 may then send a FTM Request message to initiate the FTM exchange, and receive a subsequent Ack message from STA 1 or the spoofing station. Since the FTM Request message is sent in the clear as a public action frame, the spoofing station may attempt to imitate STA 1 and provide a first FTM message (i.e., FTM_1(0,0)) with some Dialog Token at time t1'. STA 2 may provide an Ack message at time t3' and receive a second FTM message (i.e., FTM 2(t1', t4')) containing the FTM timing information (e.g., t1', t4'). STA2 knows the intended Dialog Token of the FTM frame. Upon reception of FTM_1 by the spoofing station, it can check whether the Dialog Token of the FTM frame corresponds to the one sent inside the Protected FTM Range Request. If the Dialog Token of FTM_1 matches the intended Dialog Token (probability of 1/255), upon receipt of the timing information, STA 2 may send a Protected FTM Range Report 504 including the timing information. In an example, the timing information may be the time difference between t4' and t1' (i.e., t4'−t1') or the Follow Up Dialog Token of the last FTM frame. One or more elements in the Protected FTM Range Report 504 may include encrypted information elements based on the secure handshake previously described. Since the Protected FTM Range Report 504 includes encryption, it cannot be accessed by the spoofing station. If the Dialog Token of FTM_1 does not match, STA 2 may wait to receive FTM frames with the intended Dialog Token or assess that a spoofing station is present and cancel the FTM session by sending an FTM Request frame with the Trigger field set to 0.

As illustrated in the example exchange in FIG. 5, the Protected FTM Range Report 504 is received by STA 1 prior to the transmission of any FTM exchange messages by STA 1. The timing information included in the Protected FTM Range Report 504 is determined to be erroneous/fraudulent because STA 1 is aware that it did not provide FTM exchange messages on which the timing information, or Follow Up Dialog Token, could have been based. Thus, based on the Protected FTM Range Report 504, STA 1 (or an associated position server 202) would not authenticate STA 2.

STA 1 is configured to provide FTM messages based on public action frames in response to receiving the FTM Request message from STA 2. For example, a first FTM message (i.e., FTM_1(0,0)) may be transmitted at time t1, and an Ack message may be received at time t4. A second FTM message including timing information (i.e., FTM 2(t1, t4)) is sent by STA 1 and received by STA 2. In an example, STA 2 may optionally compute an RTT value based on the timing information included in the second FTM message at stage 506 (which is denoted on FIG. 5 with dashed lines to indicate it is optional). The RTT value may be determined as (t4−t1)−(t3 −t2). STA 2 is configured to transmit a Protected FTM Range Report message 508 including the FTM timing information (e.g., t1 and t4). The Protected FTM Range Report message 508 includes one or more encrypted elements based on the security protocols established between STA 1 and STA 2. Since STA 1 is aware of the values of t1 and t4, STA 1 can validate the Protected FTM Range Report message 508 and thus authenticate the distance to STA 2 based on the time information, or the RTT value if computed at stage 506.

Referring to FIGS. 6A and 6B a Radio Measurement Request frame Action field format 600, a Fine Timing Measurement Range Report 612, and a Range entry field format 614 are shown. The reports may comply with existing protocols (e.g., Draft P802.11REVmc_D5.0), and the information elements (IE) may be configured to enable secure FTM exchanges. The Radio Measurement Request frame action field format 600 may include a category IE, a Radio Measurement Action IE, a Dialog Token IE, a Number of Repetitions IE, and a Measured Request Elements IE. The Protected FTM Range Request message 502 may include a Radio Measurement Request frame Action field format 600 such that one or more of the IEs are encrypted. The Dialog Token of the FTM frame may be part of the FTM Range subelement IDs for Fine Timing Measurement Range request. The Fine Timing Measurement Range Report 612 may include a Range Entity Count IE, a Range Entry IE, an Error Entry Count IE, an Error Entry IE, and an Optional Sub-Elements IE. The Range entry field format 614 may include a Measurement Start Time IE, a Basic Set Service Identifier (BSSID) IE, a Range IE, a Max Range Error Exponent IE, and a Reserved IE. The Protected FTM Range Report message 508 may include one or more IEs from the Fine Timing Measurement Range Report 612 and the Range entry field format 614. In an example, the Reserved IE in the Range entry field format 614 may include the FTM timing information (e.g., T4-T1, RTT value). The Optional Sub-Elements IE of the Fine Timing Measurement Range Report 612 may include a Follow-Up Dialog Token value corresponding to the last FTM frame used for the range measurement. For increased security, they could also include all the Follow-Up Dialog Token used. The Follow-Up Dialog Token value may be used in conjunction with, or as an alternative to, the FTM timing information in the Reserved IE in the Range entry field format 614. Referring to FIG. 6C, an example 620 of the content of the Optional Sub-Elements IE of the Fine Timing Measurement Range Report 612 is shown. The example includes an entry named "Last T4-T1 Received" 622. Since a station may receive multiple FTM frames with different Follow-Up Dialog Tokens and different T1, T4 values, the "Last T4-T1 Received" can specify which FTM frame the T4-T1 value corresponds to. For example, referring to FIG. 6D, the Last T4-T1 entry 622, may include a Subelement ID IE, a Length IE, a T4-T1 IE (with values in picoseconds), and the Follow-Up Dialog Token in the last FTM frame IE. The T4-T1 IE and the Follow-Up Dialog Token provide redundant methods for validating the FTM information received from a responding station.

Figure 7:
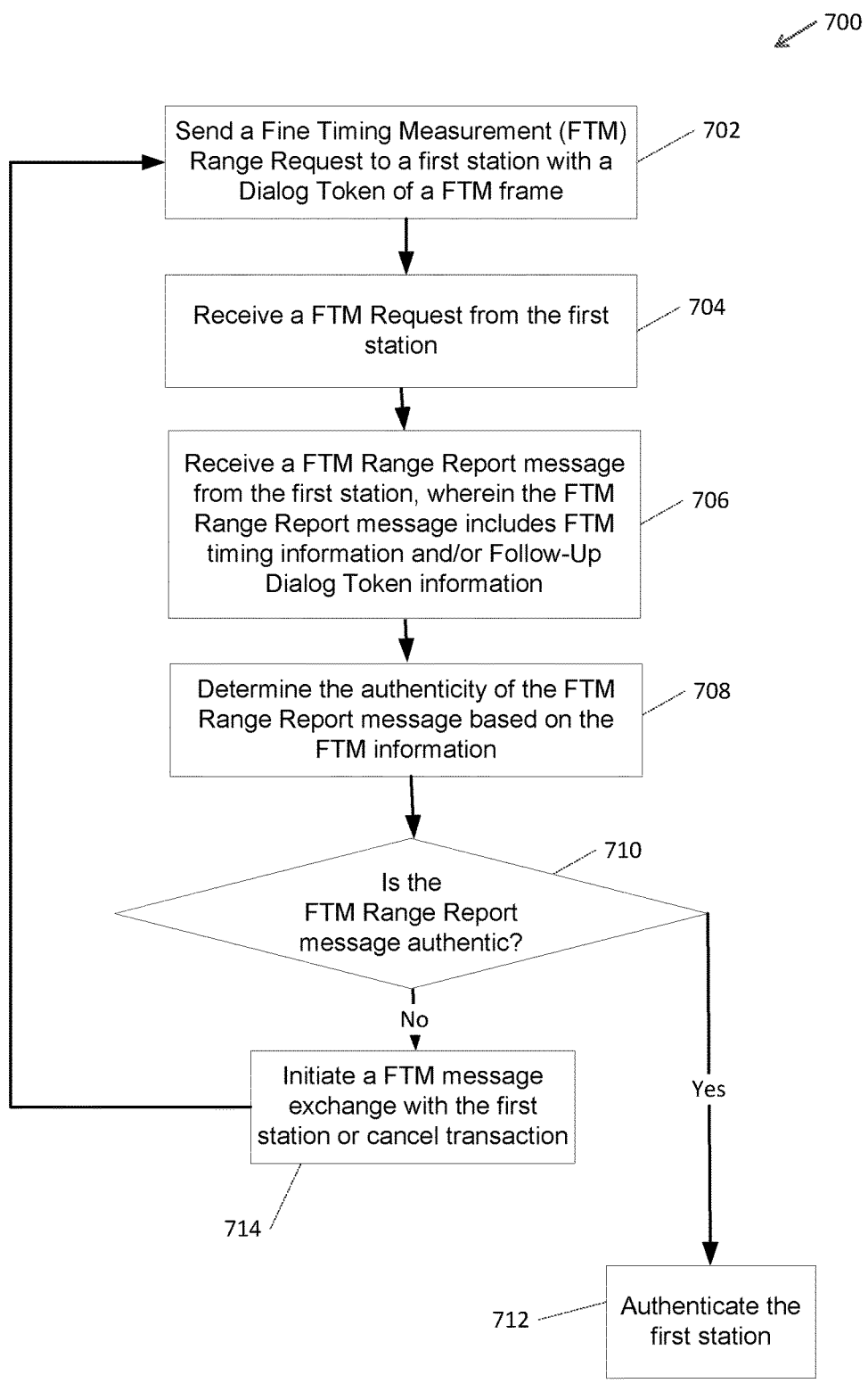
FIG. 7 is flow diagram of a process for authenticating a station based on a Fine Timing Measurement Range Report message.

In operation, referring to FIG. 7, with further reference to FIGS. 1A and 5, a process 700 for authenticating a station based on a Fine Timing Measurement Range Report message includes the stages shown. The process 700, however, is exemplary only and not limiting. The process 700 may be altered, e.g., by having stages added, removed, or rearranged. For example, the FTM timing information may be an RTT value. A Follow-Up dialog token may be included in the FTM Range Report message and may be used as a substitute for the FTM timing information.

At stage 702, an access point 102 is configured to send a Fine Timing Measurement (FTM) Range Request to a first station with a Dialog Token of a FTM frame. The access point 102 may be an element in a wireless network and may be in communication with a position server 202. The first station may be a mobile device such as the user mobile device 104. The access point 102 and the user mobile device 104 may be configured to exchange cryptographically secure information. The FTM Range Request may include one or more information elements (IEs) in the IEEE 802.11 radio measurement request frame action field format 600 and the Dialog Token of the a FTM frame, such as the initial FTM frame. The access point 102, or the position server 202, may be configured to encrypt the FTM Range request prior to sending the request to the first station.

At stage 704, the access point 102 is configured to receive a FTM request from the first station. The FTM request may be a public action frames in accordance with published protocols. For example, the FTM request may be specified in IEEE 802.11 FTM Request Frame Format (sec. 9.6.8.32). The FTM request may include LCI and Location Civic measurement requests.

At stage 706, the access point 102 is configured to receive a FTM Range Report message from the first station, such that the FTM Range Report message includes FTM timing information and/or Follow-Up Token information. The FTM Range Report message may be encrypted to facilitate secure communications between the first station and the access point 102. The FTM Range Report message includes FTM timing information derived from a previous FTM message exchange. For example, the FTM timing information may be based on an FTM exchange between the access point 102 and the first station. In an example, the FTM timing information is the value T4-T1 as determined in a FTM exchange. The FTM timing information may be a RTT value determined by the first station. Alternatively, the FTM timing information may be a value in the Follow Up Dialog token IE included in the FTM Range Report message. In an example, the FTM Range Report message may include both the FTM timing information and the Follow-Up Dialog Token information.

At stage 708, the access point 102 or the position server 202, is configured to determine the authenticity of the FTM Range Report message based on the FTM information. The FTM information may include the FTM timing information and/or the Follow-Up Dialog Token information. In an example, if a spoofing station 106 has commandeered the FTM exchange with the first station, the FTM information will correspond to the FTM values (e.g., t4, t1) received from the spoofing station 106 (i.e., as depicted in the protected FTM Range Report 504 in FIG. 5). In this case, a comparison between the expected FTM timing values and the received FTM timing values is made. The resulting difference in the FTM timing values may be compared to a previously established threshold value. The threshold value may be based on network hardware capabilities, software capabilities, or other operational considerations (e.g., required network security). Threshold values may include, but not be limited to, ranges on the order of 0.5 1, 2, 5, or 10 microseconds. In an embodiment, the FTM information may be augmented or replaced by a Follow Up Dialog token IE. The Follow Up Dialog token IE value may be compared to the Follow Up Dialog Token values provided in previous FTM frame. Thus, the authenticity of the FTM Range Report message may be confirmed if the Follow Up Dialog token IE value is consistent with the previous FTM frame sent by the station.

At stage 710, the access point 102 or the position server 202, is configured to determine if the FTM Range Report message is authentic. The determination may be based on the FTM timing values (e.g., T1, T4), the value of the Follow Up Dialog token IE, or a combination of the two. The bandwidth (i.e., pass/fail criterion) may be modified by establishing a threshold value (e.g., a tolerance) for the FTM timing values. If the FTM Range Report message is authentic, then the access point 102 (or other networked server) may authenticate the first station at stage 712. The authentication may further be based on a distance to the station, and determined by the RTT value (i.e., determining if the station is within an authentication range 122). An authenticated station may be eligible for subsequent secure transaction such as receiving funds from an ATM, opening a locked door, or purchasing goods from a vendor. Conversely, if the FTM Range Report message is not authentic, the access point 102 may cancel a transaction with the first station. In an example, if the first station is not authenticated at stage 710, the access point may be configured to initiate a FTM message exchange with the first station at stage 714. For example, referring to FIG. 5, the protected FTM range report 504 contained t4' and t1' values based on the previous FTM exchange with the spoofing station 106. The access point 102 then conducted an FTM exchange with the user mobile device 104. The order of the FTM message exchange in FIG. 5 is exemplary only, and not a limitation (i.e., the timing for an appearance of a spoofing station 106 is a random event and thus cannot be accurately determined).

Figure 8:
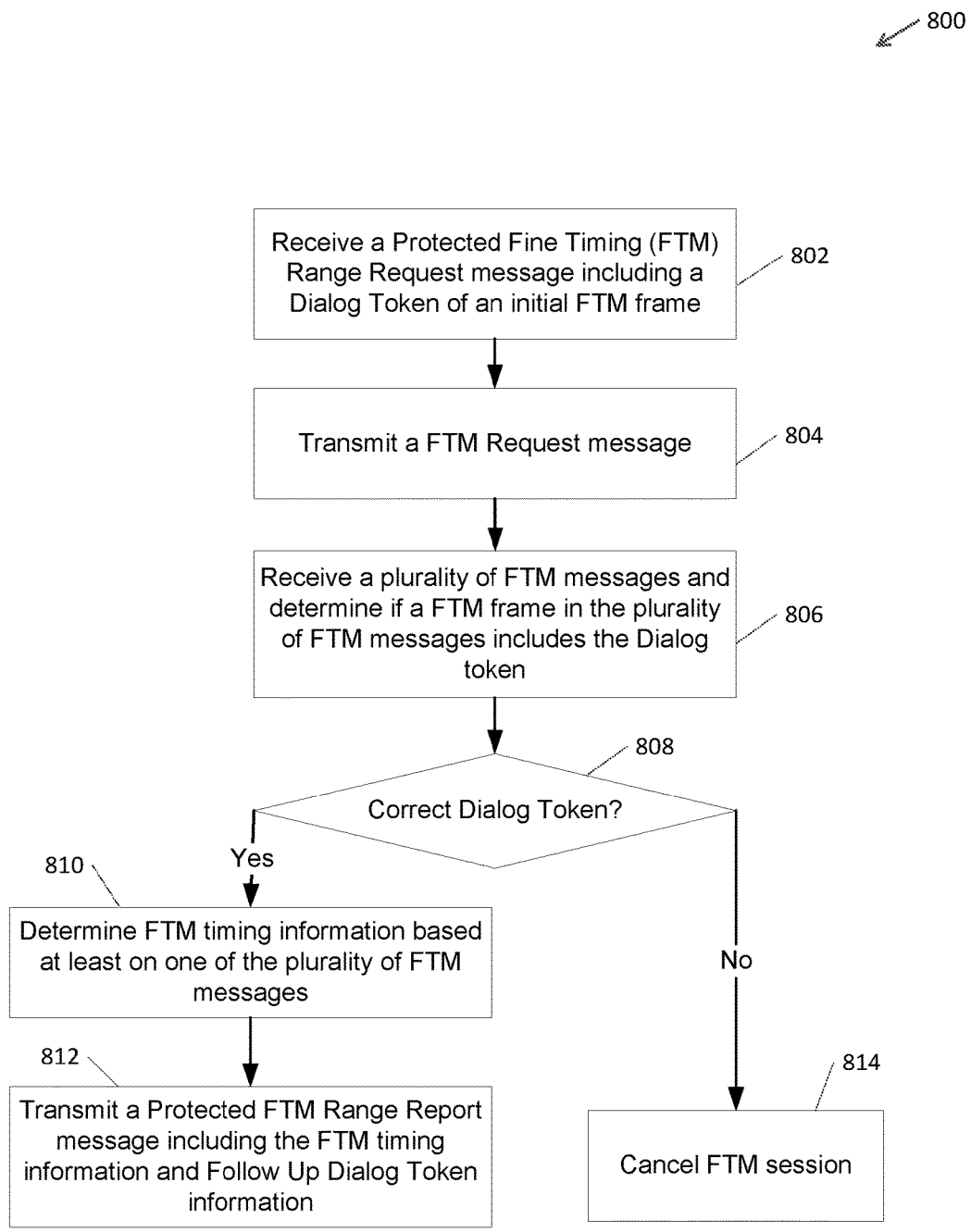
FIG. 8 is flow diagram of a process for providing a Protected FTM Range Report to a station.

In operation, referring to FIG. 8, with further reference to FIGS. 1A and 5, a process 800 for providing a Protected FTM Range Report to a station includes the stages shown. The process 800, however, is exemplary only and not limiting. The process 800 may be altered, e.g., by having stages added, removed, or rearranged. For example, a station may be configured to optionally determine an RTT value based on an FTM exchange.

At stage 802, the user mobile device 104 is configured to receive a Protected Fine Timing (FTM) range request message with a Dialog Token of a FTM frame 502. The Protected FTM Range request message 502 may be secured based on a cryptographic protocol, or other association, previously established between the user mobile device 104 and a network station (e.g., access point 102). The Protected FTM Range request message 502 may include one or more information elements included in the radio measurement request frame action field format 600, including a Dialog Token of the FTM frame. The user mobile device 104 may be configured to provide an acknowledge message in response to receiving and decoding the Protected FTM range request message 502.

At stage 804, the user mobile device 104 is configured to transmit a FTM Request message. The FTM request message may be public action frames and include unencrypted category and action information elements. The user mobile device 104 may receive an acknowledge message from a station to indicate receipt of the FTM request message.

At stage 806, the user mobile device 104 is configured to receive a plurality of FTM messages and determine if a FTM frame in the plurality of FTM messages includes the Dialog Token. The FTM messages can be public action frames including unencrypted information elements. At stage 808, the user mobile device 104 may determine if a frame (e.g., the initial FTM frame) in the plurality of FTM messages includes the same Dialog Token value as received in the FTM Range Request message at stage 802. The Dialog Token value is typically a numeric value of one octet in size, but different data types and sizes may be used. If the correct Dialog Token is not present, then the user mobile device 104 may cancel the FTM session at stage 814 or wait for the FTM to arrive with the expected Dialog Token.

At stage 810, if the Dialog Token is correct, the user mobile device 104 is configured to determine FTM timing information based on at least one of the plurality of FTM messages. In an example, the FTM timing information corresponds to the values of T1 and T4 indicated in the FTM messages. Optionally, the user mobile device 104 may determine an RTT value as the result of the equation RTT=(T4-T1)−(T3-T2). The FTM timing information may be the RTT value. In another example, the FTM timing information may be a Follow Up Dialog Token or a collection of Follow Up Dialog Token values received in the last received FTM frame. In an example, the FTM timing information includes the T1 and T4 values, its difference, or the Follow Up Dialog Token value.

At stage 812, the user mobile device 104 is configured to transmit a protected FTM range report message 508 including the FTM timing information and Follow Up Dialog Token information. The protected FTM range report message is encrypted based on a prior association between the user mobile device 104 and the receiving station (e.g., the access point 102). The protected FTM range report message may include one or more elements indicated in FIG. 6B. The FTM timing information is configured to assist the receiving station in authenticating the location of the user mobile device 104. The Follow Up Dialog Token as well as the FTM timing information provides the sending station a basis to authenticate that the FTM session has not been commandeered by a spoofing station.

Figure 9:
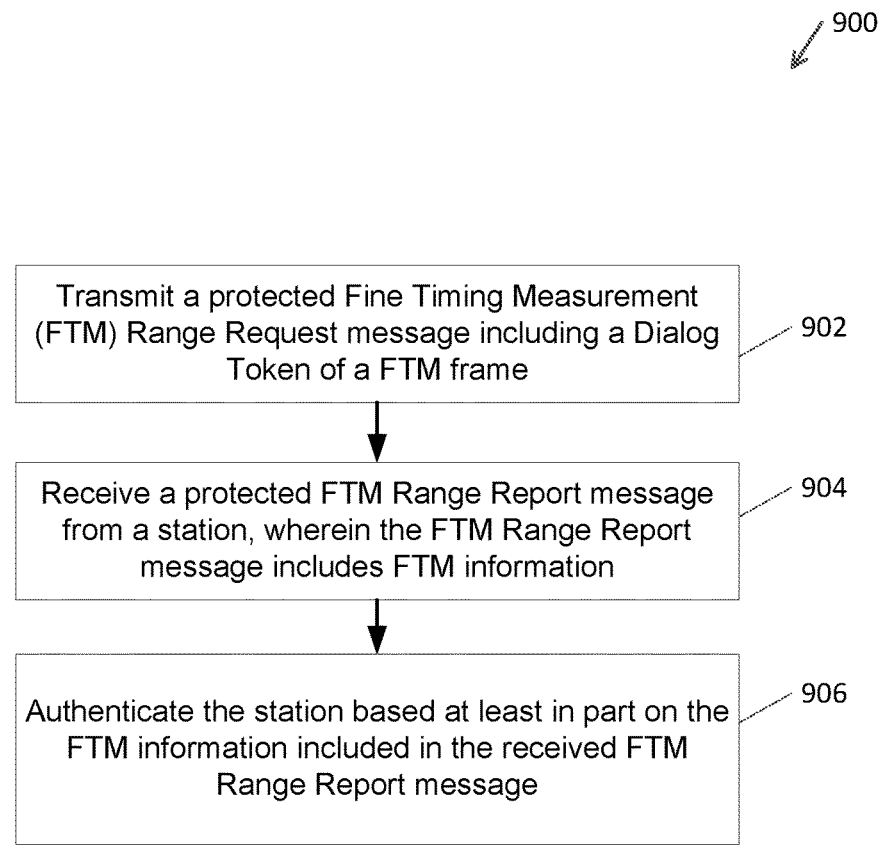
FIG. 9 is flow diagram of a process for authenticating a station based on a received FTM Range Report.

In operation, referring to FIG. 9, with further reference to FIG. 1B, a process 900 for authenticating a station based on a received FTM range report includes the stages shown. The process 900, however, is exemplary only and not limiting. The process 900 may be altered, e.g., by having stages added, removed, or rearranged.

At stage 902, a wireless kiosk 124 is configured to send a protected Fine Timing Measurement (FTM) Range Request message including a Dialog Token of a FTM frame. The wireless kiosk 124 may be an element in a network and may be in communication with a networked server. The wireless kiosk 124 is configured to conduct secure communications (e.g., not publically available) with one or more client stations in a wireless network. The FTM Range Request may include one or more information elements (IEs) in the IEEE 802.11 radio measurement request frame action field format 600. The wireless kiosk 124, or other associated network device, is configured to encrypt the FTM Range request prior to transmission to a station.

At stage 904, the wireless kiosk 124 is configured to receive a protected FTM Range Report message from a station. The FTM Range Report message is encrypted to facilitate secure communications between the station and the wireless kiosk 124. The FTM Range Report message includes FTM information derived from a previous FTM message exchange. In an example, the FTM information is the last T4-T1 value as determined in a standard FTM exchange (e.g., as described in FIG. 3). The FTM information may be an RTT value determined by the station. Alternatively, the FTM information may be a Follow Up Dialog token value or a collection of Follow Up Dialog Token values used to compute the range.

At stage 906, the wireless kiosk 124 is configured to authenticate the station based at least in part on the FTM information included in the received FTM range report message. In an example, a comparison between expected FTM information and the received FTM information is made. Authentication may depend on the magnitude of any resulting differences in the FTM information (e.g., the station may be authenticated if the differences are relatively small). In an embodiment, the FTM timing information may be augmented or replaced by a Follow Up Dialog token IE. The Follow Up Dialog token IE value may be compared to the Dialog Tokens included in the FTM frames Thus, the station may be authenticated if the Follow Up Dialog token IE value is consistent with the Follow Up Dialog token of the previously FTM frame sent by the wireless kiosk 124. The authentication may further be based on a distance to the station, and determined by the RTT value.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
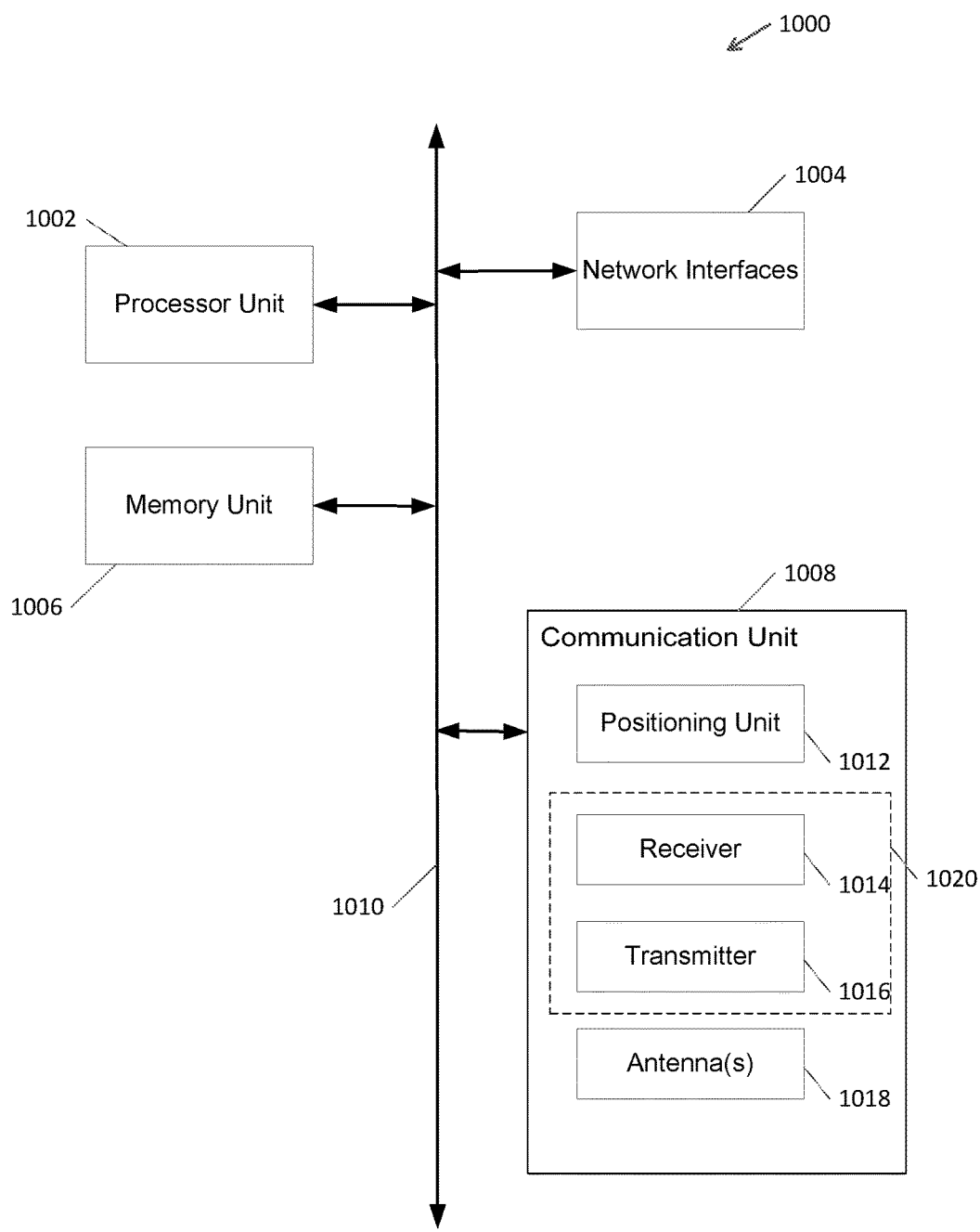
FIG. 10 is a block diagram of an exemplary client station.

Referring to FIG. 10 is a block diagram of one embodiment of an electronic device 1000 for use in a providing a secure fine timing measurement. The access point 102, wireless kiosk 124, and user mobile device 104 may be an electronic device 1000. In some implementations, the electronic device 1000 may be one of a notebook computer, a tablet computer, a netbook, a mobile phone, a gaming console, a personal digital assistant (PDA), an inventory tag, or other electronic systems comprising a WLAN device (e.g., Home Node B (HNB)) with positioning and wireless communication capabilities. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 1000 also includes a communication unit 1008. The communication unit 1008 comprises a positioning unit 1012, a receiver 1014, a transmitter 1016, and one or more antennas 1018. The transmitter 1016, the antennas 1018, and the receiver 1014 form a wireless communication module (with the transmitter 1016 and the receiver 1014 being a transceiver 1020). The transmitter 1016 and the receiver 1014 are configured to communicate bi-directionally with one or more client stations and other access points via corresponding antennas 1018. In some embodiments, the electronic device 1000 can be configured as a WLAN client station with positioning capabilities. The positioning unit 1012 can detect the fine timing request/response messages exchanged between the access points to determine FTM timing information. In an embodiment, client stations can use their processing capabilities to execute their respective operations described above. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for a passive positioning scheme for wireless communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A method for providing a secure Fine Timing Measurement (FTM) exchange between two wireless transceivers, comprising:
   transmitting a protected FTM range request message with a Dialog token of a FTM frame, wherein at least one element of the protected FTM range request message is encrypted;
   receiving a protected FTM range report message from a station, wherein the protected FTM range report message includes FTM information; and authenticating the station based at least in part on the FTM information included in the protected FTM range report message.

2. The method of claim 1 wherein at least one element of the protected FTM range report message is encrypted.

3. The method of claim 1 wherein the encryption is based on a key exchange between the two wireless transceivers.

4. The method of claim 1 wherein the encryption is based on a membership to a trusted network.

5. The method of claim 1 wherein the Dialog token transmitted in the protected FTM range request message is the Dialog token in an initial FTM frame.

6. The method of claim 1 wherein the FTM information is based on a time of departure and a time of arrival of a FTM exchange between the two wireless transceivers.

7. The method of claim 1 wherein the FTM information is a Follow Up Dialog token value or a collection of Follow Up Dialog token values.

8. The method of claim 1 wherein authenticating the station further comprises:
calculating a distance to the station based on the FTM information; and
determining if the station is within an authentication range.

9. A method of participating in a secure Fine Timing Measurement (FTM) exchange with a mobile device, comprising:
receiving a protected FTM range request message including a Dialog token of a FTM frame, wherein the protected FTM range request message includes one or more encrypted elements;
transmitting a FTM request message;
receiving a plurality of FTM messages;
determining that a Dialog token included in a FTM frame in the plurality of FTM messages matches the Dialog token included in the protected FTM range request message;
determining a FTM timing information based at least on one of the plurality of FTM messages; and
transmitting a protected FTM range report message including the FTM timing information.

10. The method of claim 9 wherein the FTM timing information is based on a time of departure value (T1) and a time of arrival value (T4) in an FTM exchange.

11. The method of claim 9 wherein the FTM timing information is a Round Trip Time (RTT) value based on the plurality of FTM messages.

12. The method of claim 9 wherein the protected FTM range report message includes the Follow Up Dialog Token value of a last frame of the plurality of FTM messages.

13. The method of claim 9 wherein the protected FTM range report message includes one or more encrypted elements.

14. The method of claim 9 wherein the FTM request message and the plurality of FTM messages are public action frames.

15. The method of claim 9 wherein the Dialog token received in the protected FTM range request message is the Dialog token in an initial FTM frame.

16. A system for providing a secure Fine Timing Measurement (FTM) exchange between two wireless transceivers, comprising:
a memory;
at least one processor operably coupled to the memory;
a transceiver operably coupled to the memory and the at least one processor, and configured to:
transmit a protected FTM range request message with a Dialog Token of a FTM frame, wherein the protected FTM range request message includes one or more encrypted elements;
receive a protected FTM range report message from a station, wherein the protected FTM range report message includes FTM information; and
wherein the at least on processor is configured to authenticate the station based at least in part on the FTM information included in the protected FTM range report message.

17. The system of claim 16 wherein at least one element of the protected FTM range report message is encrypted.

18. The system of claim 16 wherein the encryption is based on a key exchange between the two wireless transceivers.

19. The system of claim 16 wherein the encryption is based on a membership to a trusted network.

20. The system of claim 16 wherein the Dialog token transmitted in the protected FTM range request message is the Dialog token in an initial FTM frame.

21. The system of claim 16 wherein the FTM information is based on a time of departure and a time of arrival of a FTM exchange between the two wireless transceivers.

22. The system of claim 16 wherein the FTM information is a Follow Up Dialog token value or a collection of Follow Up Dialog token values.

23. The system of claim 16 wherein the at least one processor is further configured to:
calculate a distance to the station based on the FTM information; and
determine if the station is within an authentication range.

24. A client station for participating in a secure Fine Timing Measurement (FTM) exchange with a mobile device, comprising:
a memory;
at least one processor operably coupled to the memory;
a transceiver operably coupled to the memory and the at least one processor, and configured to:
receive a protected FTM range request message including a Dialog token of a FTM frame, wherein the protected FTM range request message includes one or more encrypted elements;
transmit a FTM request message;
receive a plurality of FTM messages;
wherein the at least one processor is configured to:
determine that a Dialog token included a FTM frame in the plurality of FTM messages matches the Dialog token included in the protected FTM range request message;
determine a FTM timing information based at least on one of the plurality of FTM messages; and the transceiver is configured to
transmit a protected FTM range report message including the FTM timing information.

25. The client station of claim 24 wherein the FTM timing information is based on a time of departure value (T1) and a time of arrival value (T4) in an FTM exchange.

26. The client station of claim 24 wherein the FTM timing information is a Round Trip Time (RTT) value based on the plurality of FTM messages.

27. The client station of claim 24 wherein the protected FTM range report message includes the Follow Up Dialog Token value of a last frame of the plurality of FTM messages.

28. The client station of claim 24 wherein the protected FTM range report message includes one or more encrypted elements.

29. The client station of claim 24 wherein the FTM request message and the plurality of FTM messages are public action frames.

30. The client station of claim 24 wherein the Dialog token received in the protected FTM range request message is the Dialog token in an initial FTM frame.

* * * * *